(12) United States Patent
Wittkamp

(10) Patent No.: US 8,408,588 B2
(45) Date of Patent: Apr. 2, 2013

(54) FIXTURE HAVING AIRBAG OUTLET FLAP

(75) Inventor: Juergen Wittkamp, Nettetal (DE)

(73) Assignee: Johnson Controls Technology Company, Holland, MI (US)

( * ) Notice: Subject to any disclaimer, the term of this patent is extended or adjusted under 35 U.S.C. 154(b) by 104 days.

(21) Appl. No.: 12/921,551

(22) PCT Filed: Dec. 19, 2008

(86) PCT No.: PCT/EP2008/010967
§ 371 (c)(1),
(2), (4) Date: Dec. 6, 2010

(87) PCT Pub. No.: WO2009/115112
PCT Pub. Date: Sep. 24, 2009

(65) Prior Publication Data
US 2011/0084469 A1 Apr. 14, 2011

(30) Foreign Application Priority Data
Mar. 19, 2008 (DE) .......................... 10 2008 015 044

(51) Int. Cl.
*B60R 21/20* (2006.01)
(52) U.S. Cl. .................................................. 280/728.3
(58) Field of Classification Search ................ 280/728.3
See application file for complete search history.

(56) References Cited

U.S. PATENT DOCUMENTS

| 530,642 | A | 12/1894 | Hogeboom | |
|---|---|---|---|---|
| 6,595,543 | B2 * | 7/2003 | Desprez | 280/728.3 |
| 7,234,726 | B2 * | 6/2007 | Trevino et al. | 280/728.3 |
| 7,828,323 | B1 * | 11/2010 | Mazzocchi et al. | 280/732 |
| 7,887,087 | B2 * | 2/2011 | Mazzocchi et al. | 280/728.3 |
| 8,177,255 | B2 * | 5/2012 | Le Hoang et al. | 280/728.3 |

FOREIGN PATENT DOCUMENTS

| DE | 3835581 | 4/1990 |
|---|---|---|
| DE | 4234988 | 4/1993 |
| DE | 199 58 865 A1 | 6/2001 |
| DE | 10 2007 005 922 A1 | 8/2008 |
| GB | 2 421 225 A | 6/2006 |
| JP | 2002200954 | 7/2002 |
| WO | 2006 057632 A1 | 6/2006 |

OTHER PUBLICATIONS

International Search Report for application No. PCT/EP2008/010967 mailed May 26, 2009.
European Examination Report mailed Sep. 20, 2012.

* cited by examiner

*Primary Examiner* — Faye M. Fleming
(74) *Attorney, Agent, or Firm* — Fletcher Yoder P.C.

(57) ABSTRACT

A fixture for a motor vehicle includes an airbag outlet flap in an airbag outlet region. In the region of the airbag outlet flap, at least one breaking point region is provided, along with at least one joint region. An airbag module is included that itself includes an airbag. A guide element is included such that, when the airbag is deployed, force is applied by the airbag on the guide element, force is applied to the airbag outlet flap.

8 Claims, 3 Drawing Sheets

FIXTURE HAVING AIRBAG OUTLET FLAP

CROSS REFERENCE TO RELATED APPLICATIONS

This application claims priority from and the benefit of PCT Application No. PCT/EP2008/010967, filed on Dec. 19, 2008 and German Patent DE 10 2008 015 044.4, filed on Mar. 19, 2008; all entitled "Fixture Having Airbag Outlet Flap", which are herein incorporated by reference.

BACKGROUND

The invention relates to a fixture having an airbag outlet flap, in particular a dashboard for the interior of a motor vehicle.

Generally, such airbag outlet flaps are produced by the forming or subsequent cutting or burning out of a predetermined breaking point in the carrier of the fixture. When the airbag is triggered, this predetermined breaking point tears open, the airbag outlet flap or parts thereof having to be prevented from being completely detached from the carrier and/or moving in an uncontrolled manner. Therefore, a reinforcement element and/or a retainer strap may be arranged on the rear face of the carrier or at a different point which, for example, serves as a joint for the movement of the airbag outlet flap. Such arrangements are disclosed in the publications DE 38 35 581 A1 and/or DE 42 34 988 C2 and/or JP 2002-200954 A.

SUMMARY

The object of the invention is to optimize the movement sequence of the opening airbag outlet flap when the airbag is deployed.

The object is achieved by a fixture for a motor vehicle, the fixture having an airbag outlet flap in an airbag outlet region, the fixture in the region of the airbag outlet flap comprising at least one predetermined breaking point region and at least one joint region, the fixture comprising an airbag module with an airbag, and the fixture comprising a guide element such that when the airbag is deployed, force is applied by the airbag onto the guide element.

As a result, when the airbag is triggered, it is possible in an advantageous manner for a reinforcement element provided in the joint region to be loaded to a lesser extent and thus to be able to be dimensioned to be smaller, more lightweight and more cost-effective and also for a greater degree of safety to be able to be achieved.

According to the invention, it is preferred that the guide element is provided as a guide element comprising a further joint region but which is otherwise substantially mechanically rigid.

As a result, according to the invention, it is possible in an advantageous manner for force to be transmitted particularly effectively between the deployed airbag and the airbag outlet flap.

According to the invention, it is further preferred that the guide element comprises a first end located closer to the predetermined breaking point region of the airbag outlet flap, in a normal situation and/or in a triggered situation immediately after the start of the deployment of the airbag, the first end coming into contact with the airbag outlet flap in the range of 50% to 90% of its extent, proceeding from the joint region, preferably in the range of 60% to 80%, and quite particularly preferably in the range of 65% to 70%.

As a result, according to the invention it is possible in an advantageous manner for the loading of the reinforcement element when the airbag is triggered to be effectively reduced, as the airbag outlet flap is actively set in rotational motion substantially about the joint region of the airbag outlet flap.

According to the invention it is also preferred that the guide element is provided to extend in a region between the airbag outlet flap and the airbag module at its second end, obliquely relative to the airbag outlet flap.

As a result, it is possible in an advantageous manner that in the space between the airbag module and the airbag outlet flap the rigid guide element extends obliquely and that the airbag outlet flap is preferably connected to the dashboard via a non-rigid retainer element (and/or the reinforcement element).

A further subject of the present invention relates to a method for opening an airbag outlet flap in a fixture of a motor vehicle, the fixture in the region of the airbag outlet flap comprising at least one predetermined breaking point region and at least one joint region, the fixture comprising an airbag module with an airbag, the airbag initially applying force onto a guide element when the airbag is deployed and only subsequently force being applied onto the airbag outlet flap.

As a result, advantageously the loading on the reinforcement element (and/or retainer element) provided in the joint region may be reduced when the airbag is triggered and thus may be dimensioned to be smaller, more lightweight and more cost-effective.

Moreover, in the method according to the invention it is preferred that the guide element comprising a first end located closer to the predetermined breaking point region of the airbag outlet flap, in a normal situation and/or in a triggered situation immediately after the start of the deployment of the airbag, applies force onto the airbag outlet flap in the range of 50% to 90% of its extent, proceeding from the joint region, preferably in the range of 60% to 80%, and quite particularly preferably in the range of 65% to 70%.

As a result, according to the invention it is possible in an advantageous manner for the loading of the reinforcement element when the airbag is triggered to be effectively reduced, as the airbag outlet flap is actively set in rotational motion substantially about the joint region of the airbag outlet flap.

DRAWINGS

The figures show by way of example and schematically an embodiment of the invention. Directional information refers to the usual direction of travel.

DETAILED DESCRIPTION

Figure 1:
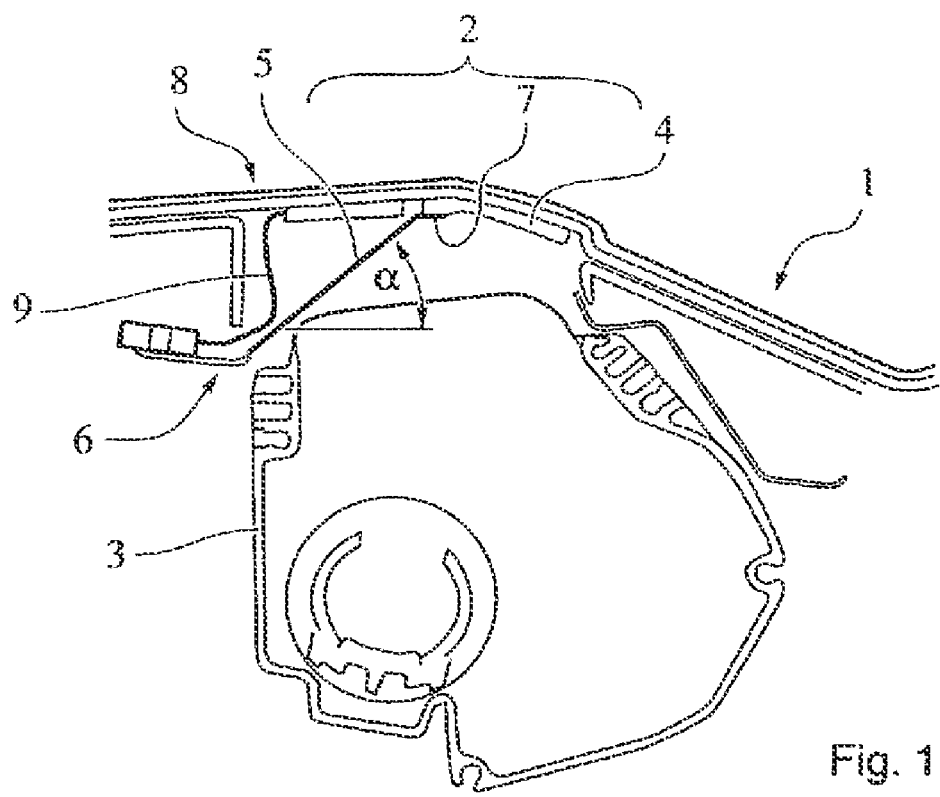
FIG. 1 shows in a schematic sectional view a detail of a dashboard as an example of a fixture.
Figure 2:
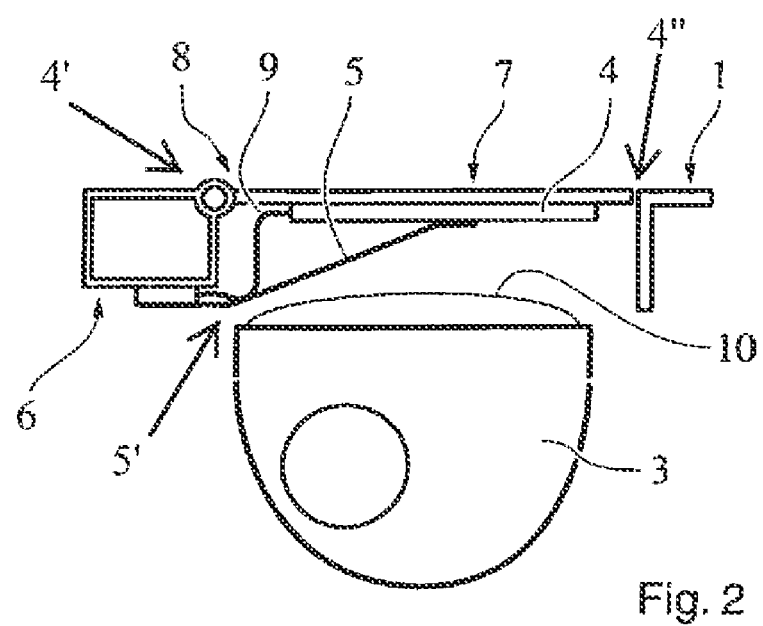
FIG. 2 shows in a further schematic sectional view by way of example a detail of a fixture with the airbag outlet flap closed.

The dashboard 1 shown in FIGS. 1 and 2 in section as an example of a fixture 1 according to the invention has an airbag outlet region 2 for an airbag 10 when it is being deployed, and which is stowed on standby in an airbag module 3. The airbag outlet region 2 is sealed on standby by an airbag outlet flap 4 (in the example arranged, in particular, approximately horizontally) which may be designed as a separate component, but preferably is integrally connected via a predetermined breaking point to the dashboard 1 and/or the fixture 1. The region of the predetermined breaking point is hereinafter also denoted as the predetermined breaking point region 4". The airbag outlet flap 4 also comprises a joint region 4' which is provided so that the airbag outlet flap 4, when the airbag 10 is triggered, is rotated around a rotational axis in the region of the joint region 4' due to the action of the force of the airbag.

A relatively rigid guide element 5, which may consist of, for example, pressed sheet steel extends (in the example shown, in particular, obliquely) in the space between the airbag outlet flap 4 and the airbag module 3, which are spaced apart from one another (in the example, in particular, in the vertical direction). The guide element 5 extends at an angle α of, for example, 45° to 60° upwards and to the rear, and/or proceeding from the side of the joint region 4' in the direction of the predetermined breaking point region 4". At its lower, front (second) end 6, the guide element 5 is connected in an articulated manner or bendable manner to the dashboard 1 (and thus has a further joint region 5') whilst its upper, rear (second) end 7 (i.e. facing the interior) bears from below approximately centrally or in the range of 50% to 90% of the extent of the airbag outlet flap 4, proceeding from the joint region 4', against the airbag outlet flap 4, i.e. is not connected thereto in a shear-resistant manner. Preferably, the first end 7 of the guide element 5 bears in a range of 60% to 80%, particularly preferably in a range of 65% to 70% against (the rear face) of the airbag outlet flap 4.

The front end 8 of the airbag outlet flap 4, i.e. in the joint region 4' of the airbag outlet flap 4, is in turn secured via a non-rigid retainer element 9 (and/or reinforcement element 9) extending initially downwardly and then to the front, for example a textile fabric with an excess length attached to the dashboard 1 and/or to the fixture 1. In the exemplary embodiment, the guide element 5 and retainer element 9 are fastened approximately at the same point on the dashboard 1.

Figure 3:
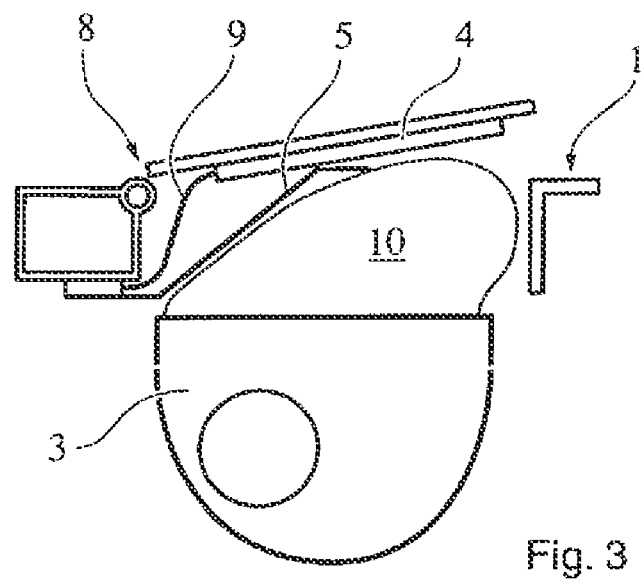
FIG. 3 shows in a further schematic sectional view by way of example a detail of the fixture with the airbag outlet flap open, but not yet completely open.
Figure 4:
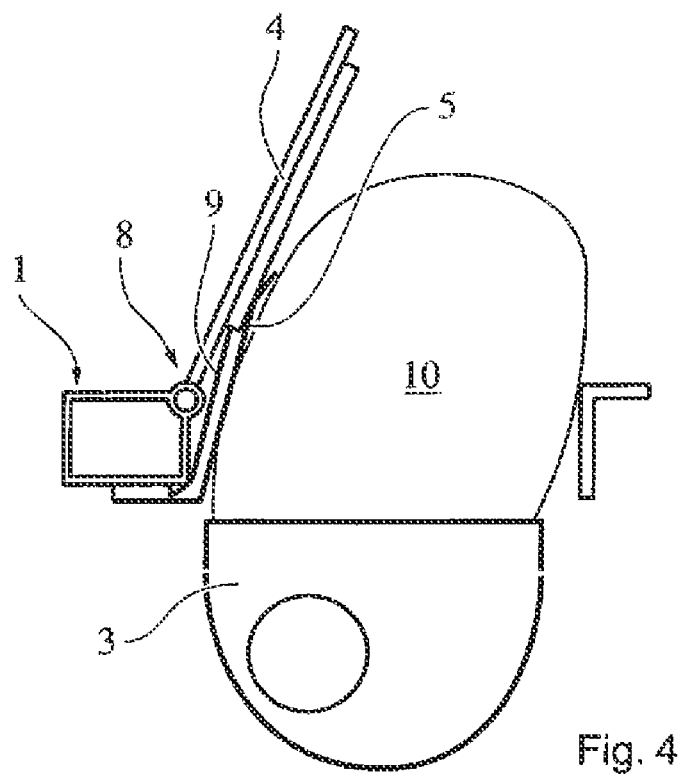
FIG. 4 shows in a further schematic sectional view by way of example a detail of the fixture with the airbag outlet flap completely open.

When triggering the airbag 10 shown in FIGS. 3 and 4, said airbag comes into contact from below with the guide element 5 and is deflected thereby obliquely (to the rear), the airbag outlet flap 4 being released upwardly from the dashboard 1 by a simultaneous slight rotation about the joint region 4' (for example in the direction of the windshield) as a result of force introduced via the guide element 5. The loop-like excess length of the retainer element 9 is successively used up, whilst the guide element 5 slides along the airbag outlet flap 4 to the front, i.e. in the direction of the windshield (relative to the airbag outlet flap 4). The airbag outlet region 2 is substantially opened when the airbag outlet flap 4 protrudes upwards, the retainer element 9 being tensioned. Thus, for example, the front end 8 of the airbag outlet flap 4 strikes in the manner of an abutment against the associated edge of the dashboard 1 as shown in FIG. 4.

Figure 5:
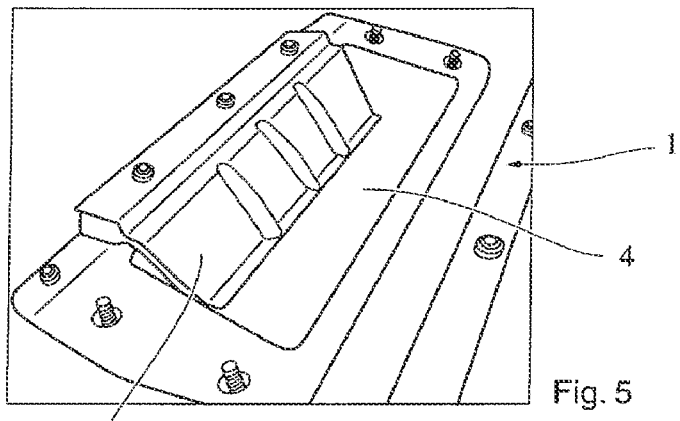
FIGS. 5 to 7 show different views of the underside of a dashboard 1 designed according to the invention.
Figure 6:
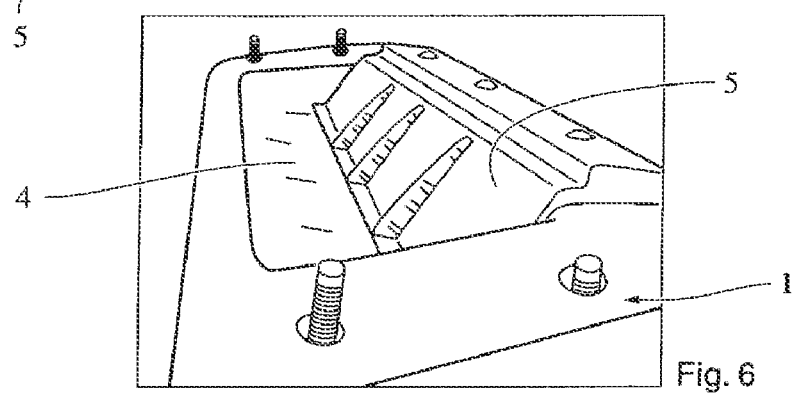
Figure 7:
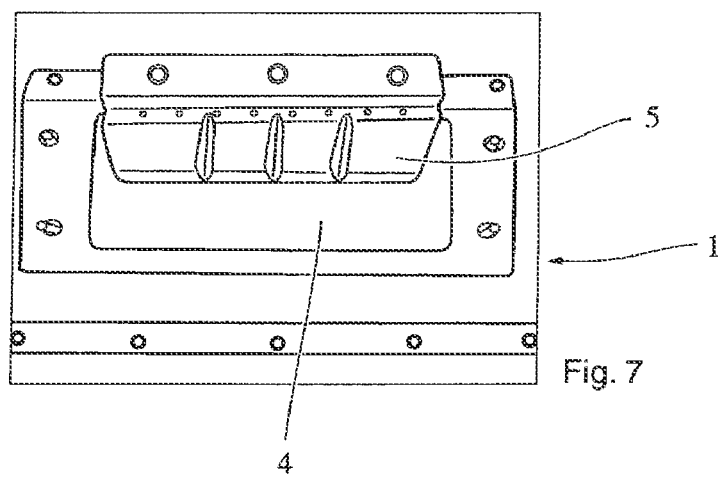

FIGS. 5 to 7 show different views of the underside of a dashboard 1 designed according to the invention, the guide element 5, the further joint region 5' of the guide element 5, the airbag outlet flap 4, as well as the dashboard 1 and/or the fixture 1 being shown.

LIST OF REFERENCE NUMERALS

1 Fixture/dashboard
2 Airbag outlet region
3 Airbag module
4 Airbag outlet flap
4' Joint region
4" Predetermined breaking point region
5 Guide element
5' Further joint region
6 Second end (of guide element 5)
7 First end (of guide element 5)
8 End (of airbag outlet flap)
9 Retainer element
10 Airbag

The invention claimed is:

1. A fixture for a motor vehicle, comprising an airbag outlet flap in an airbag outlet region;
   in a region of the airbag outlet flap at least one predetermined breaking point region and at least one joint region;
   an airbag module with an airbag; and
   a guide element such that when the airbag is deployed, force is applied by the airbag onto the guide element;
   wherein the guide element comprises a first end located closer to the predetermined breaking point region of the airbag outlet flap;
   wherein the guide element comprises a further joint region; but wherein the guide element is otherwise substantially mechanically rigid;
   wherein the guide element extends, in a region between the airbag outlet flap and the airbag module at a second end thereof, obliquely relative to the airbag outlet flap.

2. The fixture as claimed in claim 1, wherein in a normal situation and/or in a triggered situation immediately after the start of the deployment of the airbag, the first end coming into contact with the airbag outlet flap in a range of 50% to 90% of its extent, proceeding from the joint region.

3. A method for opening an airbag outlet flap in a fixture of a motor vehicle, the fixture in the region of the airbag outlet flap comprising at least one predetermined breaking point region and at least one joint region, the fixture comprising an airbag module with an airbag, the method comprising initially applying force by the airbag onto a guide element when the airbag is deployed and only subsequently applying force onto the airbag outlet flap.

4. The method as claimed in claim 3, wherein the guide element comprises a first end located closer to the predetermined breaking point region of the airbag outlet flap, and wherein in a normal situation and/or in a triggered situation immediately after the start of the deployment of the airbag, the guide element applies force onto the airbag outlet flap in a range of 50% to 90% of its extent, proceeding from the joint region.

5. The fixture as claimed in claim 2, wherein in a normal situation and/or in a triggered situation immediately after the start of the deployment of the airbag, the guide element applies force onto the airbag outlet flap in a range of 60% to 80% of its extent proceeding from the joint region.

6. The fixture as claimed in claim 2, wherein in a normal situation and/or in a triggered situation immediately after the start of the deployment of the airbag, the guide element applies force onto the airbag outlet flap in a range of 65% to 70% of its extent proceeding from the joint region.

7. The method as claimed in claim 4, wherein in a normal situation and/or in a triggered situation immediately after the start of the deployment of the airbag, the guide element applies force onto the airbag outlet flap in a range of 60% to 80% of its extent proceeding from the joint region.

8. The method as claimed in claim 4, wherein in a normal situation and/or in a triggered situation immediately after the start of the deployment of the airbag, the guide element applies force onto the airbag outlet flap in a range of 65% to 70% of its extent proceeding from the joint region.

\* \* \* \* \*